(12) United States Patent
Jung

(10) Patent No.: US 9,013,371 B2
(45) Date of Patent: Apr. 21, 2015

(54) DISPLAY APPARATUS AND CONTROL METHOD THEREOF

(75) Inventor: Sung Soo Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1187 days.

(21) Appl. No.: 12/781,019

(22) Filed: May 17, 2010

(65) Prior Publication Data

US 2010/0309102 A1   Dec. 9, 2010

(30) Foreign Application Priority Data

Jun. 8, 2009   (KR) .................... 10-2009-0050335

(51) Int. Cl.
    *G09G 3/20*     (2006.01)
    *G06F 1/16*     (2006.01)
    *G02F 1/1333*     (2006.01)
    *G02F 1/1335*     (2006.01)

(52) U.S. Cl.
    CPC ........ *G06F 1/1601* (2013.01); *G02F 1/133308* (2013.01); *G02F 1/1336* (2013.01); *G02F 2001/13332* (2013.01)

(58) Field of Classification Search
    CPC .......... G09G 5/003; G09G 2310/0232; G09G 2320/08
    USPC ........... 345/55–111; 362/23.19–23.2, 296.01, 362/298–301, 311.06–311.1, 382, 362/600–634; 315/169.1–169.4
See application file for complete search history.

(56) References Cited

U.S. PATENT DOCUMENTS

| | | | |
|---|---|---|---|
| 6,457,328 B1 * | 10/2002 | Tsai ..................................... | 63/3 |
| 2004/0149892 A1 | 8/2004 | Akitt et al. | |
| 2004/0204226 A1 | 10/2004 | Foster et al. | |
| 2006/0232915 A1 * | 10/2006 | Chou et al. ..................... | 361/681 |
| 2008/0112119 A1 | 5/2008 | Wang et al. | |
| 2009/0168319 A1 | 7/2009 | Jeon et al. | |
| 2009/0303229 A1 | 12/2009 | Kwisthout et al. | |
| 2010/0026707 A1 * | 2/2010 | Hoogenstraaten et al. ... | 345/595 |

(Continued)

FOREIGN PATENT DOCUMENTS

| | | |
|---|---|---|
| CN | 1831606 | 9/2006 |
| JP | 2002077339 | 3/2002 |

(Continued)

OTHER PUBLICATIONS

Extended European Search Report dated Oct. 7, 2013 issued in EP Application No. 10786314.4.

(Continued)

*Primary Examiner* — Michael Pervan
(74) *Attorney, Agent, or Firm* — Staas & Halsey LLP

(57) ABSTRACT

A display apparatus including a light emitting body to improve external appearance thereof. The light emitting body is disposed inside a bezel to emit light. The bezel has a reflective surface to reflect light emitted from the light emitting body in front of the display apparatus. The bezel also has a light interruption groove to prevent light emitted from the light emitting body from affecting an image formed on the display module. The light emitting body is operatively connected to a user interface unit. A user manipulates a manipulation panel or a remote control to set an operation mode of the light emitting body from a menu item on an on screen display, and the light emitting body emits light in various forms based on the set mode.

31 Claims, 11 Drawing Sheets

(56) References Cited

U.S. PATENT DOCUMENTS

| | | | |
|---|---|---|---|
| 2010/0052548 A1* | 3/2010 | Allard et al. | 315/154 |
| 2010/0053229 A1 | 3/2010 | Krijn et al. | |
| 2010/0091193 A1 | 4/2010 | Hoogenstraaten et al. | |
| 2010/0097408 A1 | 4/2010 | Marcellinus et al. | |
| 2011/0018849 A1 | 1/2011 | Lowe et al. | |

FOREIGN PATENT DOCUMENTS

| | | |
|---|---|---|
| JP | 2007-184772 | 7/2007 |
| JP | 2007220651 | 8/2007 |
| JP | 2007535215 | 11/2007 |
| KR | 20060091506 | 8/2006 |
| KR | 20-0434069 | 12/2006 |
| KR | 20080039682 | 5/2008 |
| WO | 2008/081387 | 7/2008 |

OTHER PUBLICATIONS

Chinese Office Action dated Jan. 15, 2014 issued in CN Application No. 201080025614.5.

Japanese Office Action dated Feb. 25, 2014 issued in JP Application No. 2012-514876.

Japanese Office Action mailed Nov. 25, 2014 in corresponding Japanese Patent Application No. 2012-514876.

* cited by examiner

DISPLAY APPARATUS AND CONTROL METHOD THEREOF

CROSS-REFERENCE TO RELATED APPLICATIONS

This application claims priority under 35 U.S.C. §119(a) of Korean Patent Application No. 2009-0050335, filed on Jun. 8, 2009 in the Korean Intellectual Property Office, the disclosure of which is incorporated herein by reference.

BACKGROUND

1. Field of the Invention

Exemplary embodiments of the present general inventive concept relate to a display apparatus including a light emitting body to improve external appearance thereof and a control method thereof.

2. Description of the Related Art

A display apparatus displays an image on a screen thereof. Representative examples of the display apparatus include a liquid crystal display (LCD) or a plasma display panel (PDP).

Generally, the display apparatus includes a display module to form an image, a front cover to cover a front edge of the display module, and a rear cover to cover a rear of the display module.

In recent years, the quality of the display apparatus has been improved, with the result emphasizing a design to please user's aesthetic senses in addition to a fundamental function of the display apparatus.

Since the front of the display apparatus is easily visible, product image greatly changes depending upon how the front of the display apparatus is designed. Therefore, the external appearance of the front of the display apparatus may be improved to provide a high-quality product image to users.

A high-quality finishing material may be used, or an additional polishing operation may be performed, to improve the external appearance of the front of the display apparatus.

SUMMARY

The present general inventive concept provides a display apparatus having an improved exterior design.

Exemplary embodiments of the present general inventive concept provide a display apparatus having an exterior design which may be changed based on a user's intention.

Additional features and utilities of the present general inventive concept will be set forth in part in the description which follows and, in part, will be obvious from the description, or may be learned by practice of the present general inventive concept.

In accordance with an exemplary embodiment of the present general inventive concept, a display apparatus may include a display module to form an image, a bezel disposed at a side of the display module to constitute a front edge of the display apparatus, and a light emitting body disposed in the bezel, the light emitting body being operatively connected to a user interface unit manipulated by a user to perform a light emitting operation.

The bezel may be formed of a transparent material and/or a semitransparent material.

The light emitting body may include at least one selected from a group consisting of a band light source body and a dot light source body as a light source.

The band light source body may include at least one selected from a group consisting of an electro luminescent (EL) sheet and optical fiber.

The bezel may include a semitransparent part formed of a semitransparent material to show color change and a transparent part formed of a transparent material to easily transmit light, the semitransparent part being disposed in front of the transparent part.

The semitransparent part may include a thickness change part to induce color change by difference in light transmissivity.

The thickness change part may have a thickness gradually decreased toward an outside of the bezel.

The display apparatus may further include a front cover to cover a front edge of the display module and a rear cover to cover a rear of the display module, the bezel being disposed between the front cover and the rear cover while surrounding an outside of the front cover.

The bezel may include a reflective surface to guide light emitted from the light emitting body in front of the display apparatus.

The bezel may include a light interruption groove to prevent light emitted from the light emitting body from reaching the display module.

The front cover may be formed of an opaque material to interrupt light.

The reflective surface may include a first reflective surface adjacent to the light emitting body and a second reflective surface from which light reflected from the first reflective surface is reflected.

The front cover and the bezel may be coupled to each other by a double-sided adhesive tape.

The front cover and the bezel may be integrally molded by double injection.

The user interface unit may include a manipulation panel mounted at the display apparatus and a remote control to transmit and receive a signal to and from the display apparatus.

The display apparatus may further include an on screen display to display information to manipulate the display apparatus on the display module, and the light emitting operation of the light emitting body may be selected by selection of a menu item displayed through the on screen display.

The menu item may include a first mode in which the light emitting body emits light as long as power is supplied to the display apparatus, a second mode in which the light emitting body emits light while the display module is under operation, and a third mode in which the light emitting body temporarily blinks whenever a signal to manipulate the display apparatus is input by a user.

Exemplary embodiments of the present general inventive concept also provide an interactive display apparatus with a front viewing side including a frame having an opening to expose a screen at the front viewing side, a light emitting body disposed in the frame to emit light, a bezel to surround the frame to deliver light from the light emitting body to an outside of the interactive display apparatus, and a controller to control the light emitting body.

Exemplary embodiments of the present general inventive concept also provide a display apparatus including a display module to display an image, a frame disposed to support the display module, a light emitting body disposed in the frame to emit light; a bezel disposed in the frame to expose the light to an outside of the frame, and a controller to control the display module and to control the light emitting body to change a light emitting operation of the light emitting body.

BRIEF DESCRIPTION OF THE DRAWINGS

Exemplary embodiments of the present general inventive concept will become apparent and more readily appreciated from the following description of the embodiments, taken in conjunction with the accompanying drawings in which.

DETAILED DESCRIPTION OF THE EMBODIMENTS

Figure 1:
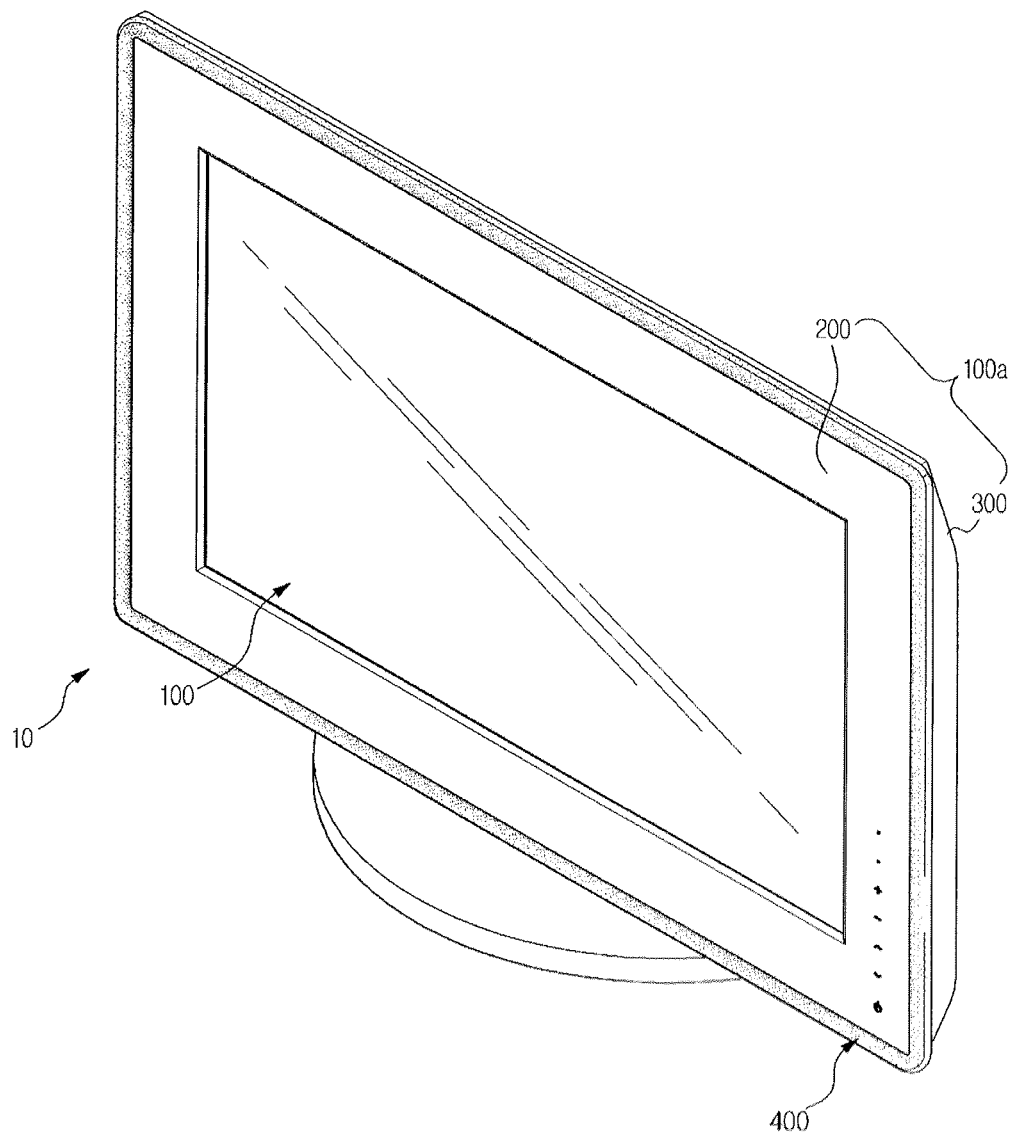
FIG. 1 is a perspective view illustrating the external appearance of a display apparatus according to an exemplary embodiment of the present general inventive concept.

Reference will now be made in detail to the embodiments of the present general inventive concept, examples of which are illustrated in the accompanying drawings, wherein like reference numerals refer to like elements throughout. The exemplary embodiments are described below in order to explain the present general inventive concept by referring to the figures.

Figure 2:
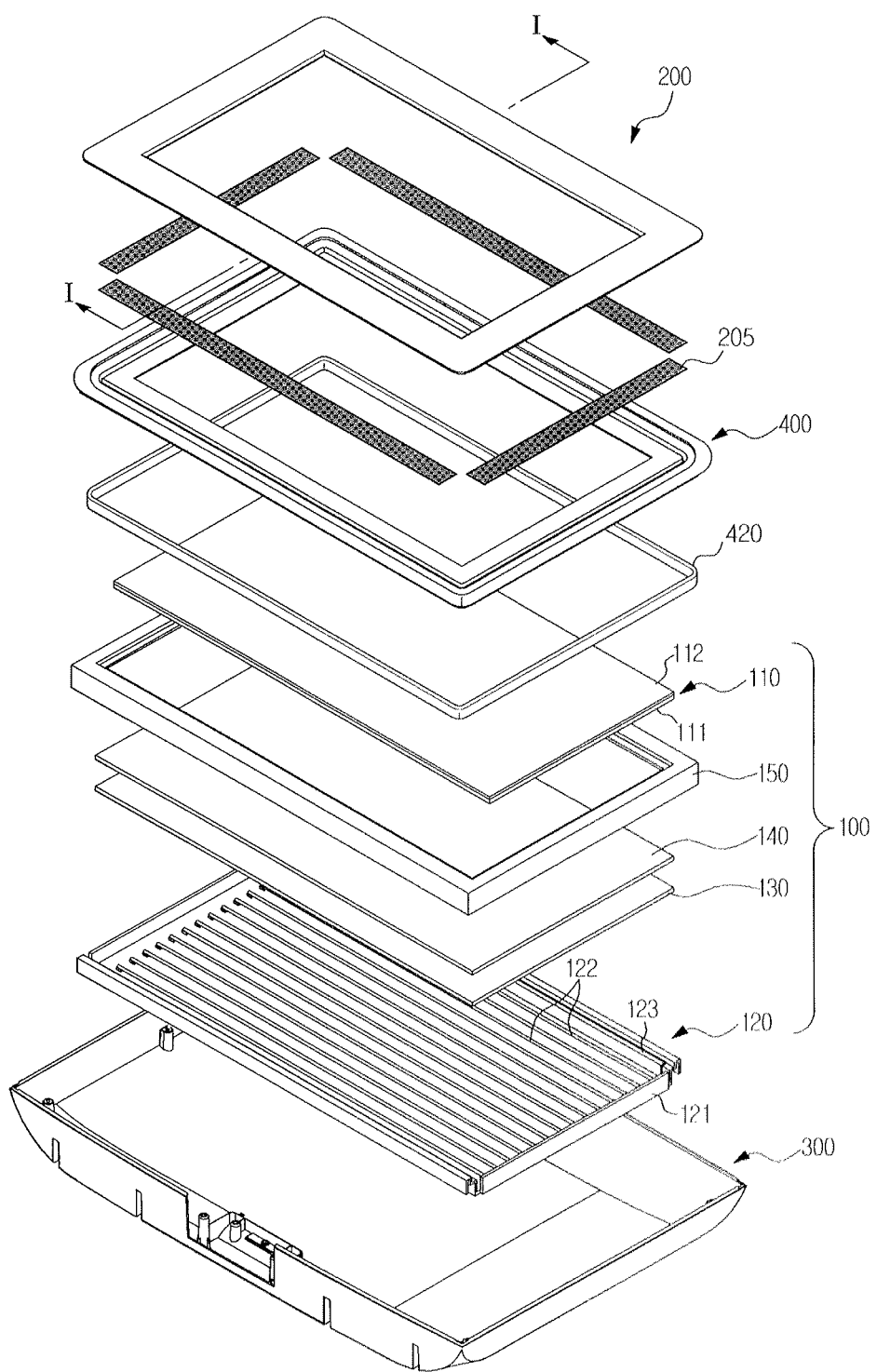
FIG. 2 is an exploded perspective view of the display apparatus of FIG. 1.
Figure 3:
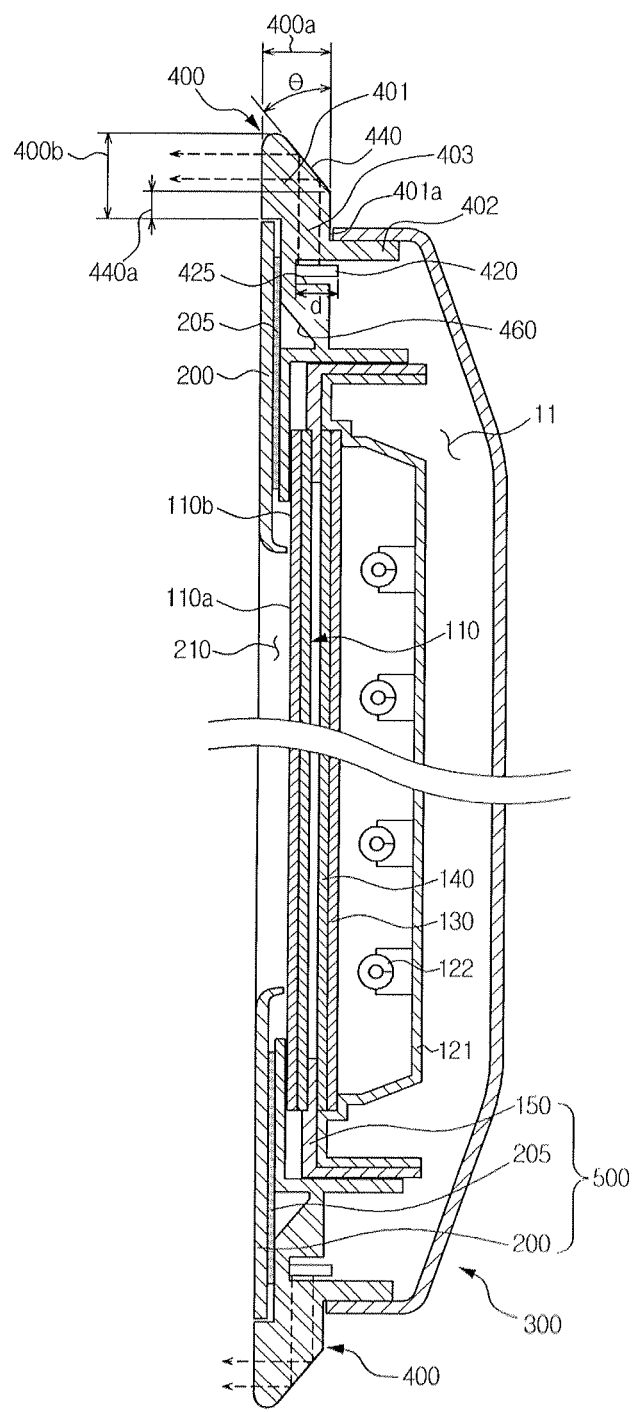
FIG. 3 is a sectional view taken along line I-I of FIG. 1.
Figure 4:
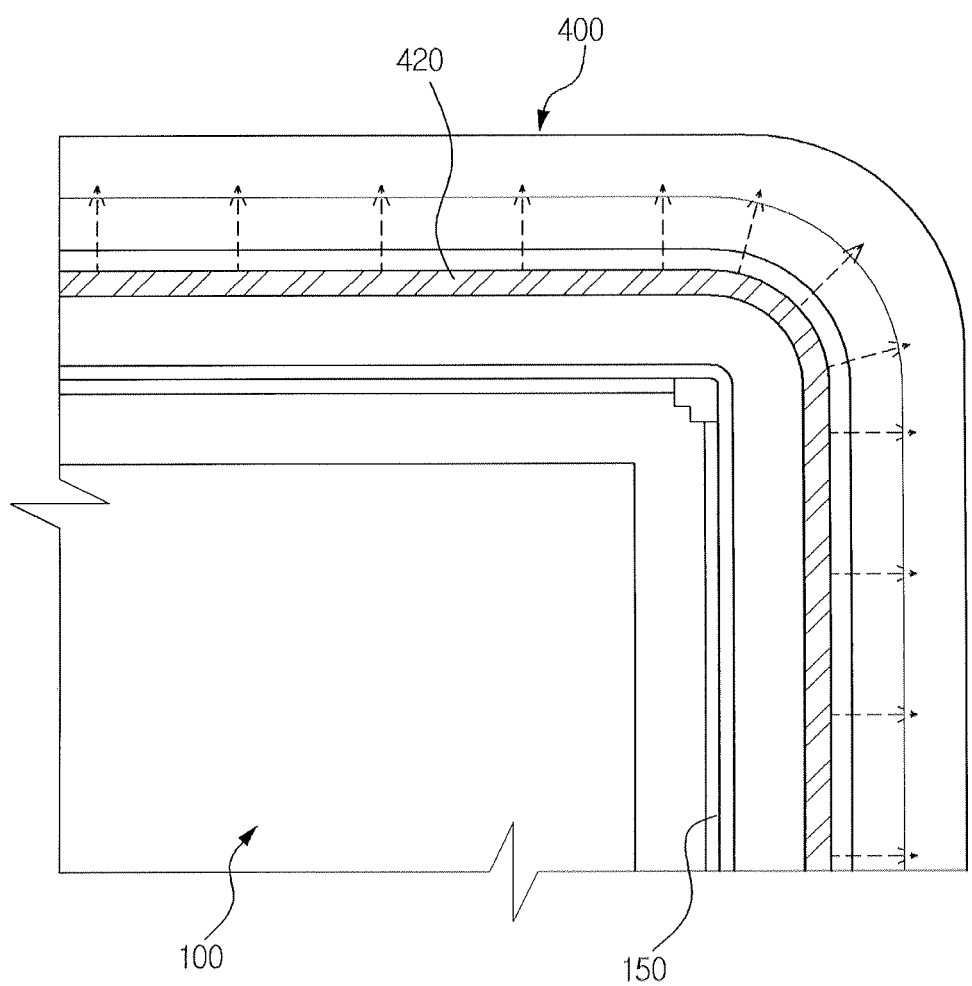
FIG. 4 is a rear view of the display apparatus of FIG. 1 with a rear cover removed.

FIG. 1 is a perspective view illustrating the external appearance of a display apparatus according to an exemplary embodiment of the present general inventive concept, FIG. 2 is an exploded perspective view of the display apparatus of FIG. 1, FIG. 3 is a sectional view taken along line I-I of FIG. 1, and FIG. 4 is a rear view of the display apparatus of FIG. 1 with a rear cover removed.

As illustrated in FIGS. 1 to 4, the display apparatus 10 may include a display module 100 to display an image, a frame 100a comprising a front cover 200 and rear cover 300, the front cover 200 disposed in front of the display module 100, the rear cover 300 to cover the rear of the display module 100, and a bezel disposed between the front cover 200 and the rear cover 300 while surrounding the outside of the front cover 200.

The front cover 200, the bezel 400, and the rear cover 300 are coupled to define a receiving space 11. In the receiving space 11 may be installed various kinds of components including the display module 100.

In this exemplary embodiment of the present general inventive concept, the display apparatus is a liquid crystal display apparatus. The display module 100 may include a display panel 110 to display an image using liquid crystals and a backlight assembly 120 to irradiate light to the display panel 110.

The display panel 110 may include a thin film transistor (TFT) substrate 111, a color filter substrate 112 opposite to the TFT substrate 111, and a liquid crystal layer (not illustrated) disposed between the TFT substrate 111 and the color filter substrate 112. The display panel 110 may adjust transmissivity of light irradiated from the backlight assembly 120 to display an image.

The display panel 110 may include an effective surface 110a to display an image and an edge surface 110b disposed on the border of the effective surface 110a.

The backlight assembly 120 may include a bottom chassis 121, lamps 122 disposed in the bottom chassis 121, and a reflection plate 123 to reflect light beams emitted from the lamps 122 to the display panel 110.

Between the display panel 110 and the backlight assembly 120 may be disposed optical sheets to improve optical properties of light irradiated from the backlight assembly 120. The optical sheets may include a diffusion plate 130 and a condensing sheet 140. The diffusion plate 130 may diffuse light irradiated from the backlight assembly 120 to improve the uniformity of brightness. The condensing sheet 140 may align the directions of light beams diffused by the diffusion plate 130 such that the light beams are perpendicularly incident on the display panel 110.

Also, a middle mold 150 may be disposed between the display panel 110 and the backlight assembly 120. The optical sheets 130 and 140 may be supported between the middle mold 150 and the bottom chassis 121.

The bezel 400 is disposed in front of the display panel 110. The display panel 110 may be supported between the bezel 400 and the middle mold 150. The front cover 200 is disposed in front of the bezel 400. The front cover 200 may be formed in the shape of a rectangular frame.

The effective surface 110a of the display panel 110 may be exposed outward through an opening 210 formed in the front cover 200.

As illustrated in FIG. 3, the bezel 400 is disposed between the front cover 200 and the rear cover 300 and at the side of the display module 100. The bezel 400 may constitute a front edge of the display apparatus 10.

The bezel 400 may be formed of a transparent material. The bezel 400 may be formed of plastic, such as polycarbonate (PC), polymethyl methacrylate (PMMA), or acrylonitrile-butadiene-styrene (ABS).

The frame 100a may further comprise at least one side to define a bezel opening 401 exposing the bezel disposed around the screen facing a front viewing side.

The bezel 400 may comprise a first portion 401 within a bezel opening of the frame, a second portion 402 disposed in the frame facing the light emitting body, and a third portion 403 connecting the first portion and second portion. The first portion 401 may be surrounded by the front cover 200 and rear cover 300, wherein the first portion 401 may be exposed only toward a front viewing side of the display apparatus. Also, the first portion 401 may be surrounded by the front cover 200 and rear cover 300, where the first portion 401 may be exposed toward a front viewing side as well as a rear side of the display apparatus, as illustrated in FIG. 3.

A mounting groove 425 is formed in the rear of the bezel 400 in the shape of a rectangular frame. A light emitting body 420 may couple in the mounting groove 425.

In this exemplary embodiment of the present general inventive concept, the light emitting body 420 is a body to emit light when power is supplied to the body. The light emitting body 420 may include a band light source body as a light source. The band light source body may be formed in the shape of a band having a predetermined width d. The band light source body is fitted in the mounting groove 425 of the bezel 400.

The band light source body may be formed of various kinds of materials, such as an electro luminescent (EL) sheet or optical fiber. In this exemplary embodiment, the band light source body is formed of the EL sheet.

The EL sheet is a light emitting sheet using an EL phenomenon, which is thin and light-weight like paper. The EL sheet may be formed of a light emitting inorganic material.

When a fluorescent substance, which may constitute a light emission layer, is applied to a transparent film, and alternating current voltage may be applied to the fluorescent substance, the fluorescent substance is rapidly charged and discharged by an electric field. At this time, the movement of electrons may appear in the form of light, which is electro luminescence.

The EL sheet may have a very small thickness of 300 microns or less and a low power consumption equivalent to one third of that of a light emitting diode (LED). Also, the entire surface of the EL sheet may emit light to supply light more uniformly than the LED, which emits light in a dot light emitting manner. Furthermore, little heat may be generated from the EL sheet with the result that the EL sheet has a long life span, and the EL sheet is not damaged even when the EL sheet is bent.

When the band light source body is formed of the EL sheet as in this exemplary embodiment of the present general inventive concept, light may be uniformly emitted from the entire rectangular frame of the bezel 400, thereby improving aesthetics of the display apparatus 10.

In this case, the light emitting body 420 may emit various kinds of colors by changing colors of the fluorescent substance applied to the EL sheet.

Also, as illustrated in FIG. 4, the flexible EL sheet may be disposed at four corners of the display apparatus 10, with the result that light is uniformly emitted without interruption.

The band light source body may be formed of optical fiber. In this case, a pattern may be formed at the surface of the optical fiber. When no pattern is formed at the surface of the optical fiber, light in the optical fiber may be interrupted, with the result that the light is not exposed to the outside. When a pattern is formed at the surface of the optical fiber, light is uniformly emitted along the entire length of the optical fiber through the pattern.

The bezel 400 may be provided at the edge thereof with a reflective surface 440 to reflect light emitted from the light emitting body 420 in front of the display apparatus 10. In this case, light may advance from a dense medium (the bezel 400) to a rare medium (air), and therefore, total reflection based on a principle of critical angle may be achieved.

That is, light emitted from the light emitting body 420 is incident on the reflective surface 440 at an angle greater than the critical angle. When a refractive index is decided based on the material of the bezel 400, and a critical angle may be decided accordingly, the position of the light emitting body 420 and a tilt angle θ of the reflective surface 440 are appropriately adjusted such that light emitted from the light emitting body 420 is incident on the reflective surface 440 at an angle greater than the critical angle.

As a result, light emitted from the light emitting body 420 may be incident on the reflective surface 440 at an angle greater than the critical angle, and the incident light may be totally reflected from the reflective surface 440 and is then directed in front of the display apparatus 10.

The bezel 400 may be provided at the inside thereof with a light interruption groove 460 to prevent light emitted from the light emitting body 420 from reaching the display module 100.

Light emitted from the light emitting body 420 may not affect an image formed on the display module 100. When light emitted from the light emitting body 420 reaches the light interruption groove 460, the light is reflected and dispersed by the light interruption groove 460, with the result that the light may be prevented from advancing toward the display module 100.

A distance 440a defines the distance between the front cover 200 and rear cover 300 and the reflective surface 440 of the bezel 400. A width 400a defines the width of the portion of the bezel 400 positioned along the exterior perimeter of the display apparatus 10. A length 400b defines the length of the portion of the bezel 400 positioned along the exterior perimeter of the display apparatus 10.

The front cover 200 may be coupled to the front of the bezel 400.

The front cover 20 may be formed of an opaque material. Even though light emitted from the light emitting body 420 of the bezel 400 may be discharged outward when viewing the display apparatus 10 from the front of the display apparatus 10, the light may not be exposed outward through the front cover 200, with the result that a user does not have trouble in watching an image formed on the display module 100.

The front cover 200 and the bezel 400 may be coupled to each other by a double-sided adhesive tape 205. Alternatively, the front cover 200 and the bezel 400 may be integrally molded. In this case, a double injection method may be used. An injection sequence is decided for convenience of molding.

A bezel support unit 500 supporting the bezel within the display apparatus 10 comprises the middle mold 150, the double-sided adhesive tape 205, the front cover 200, and the rear cover 300.

Hereinafter, the operation of the light emitting body 420 according to an exemplary embodiment of the present general inventive concept will be described.

Figure 5:
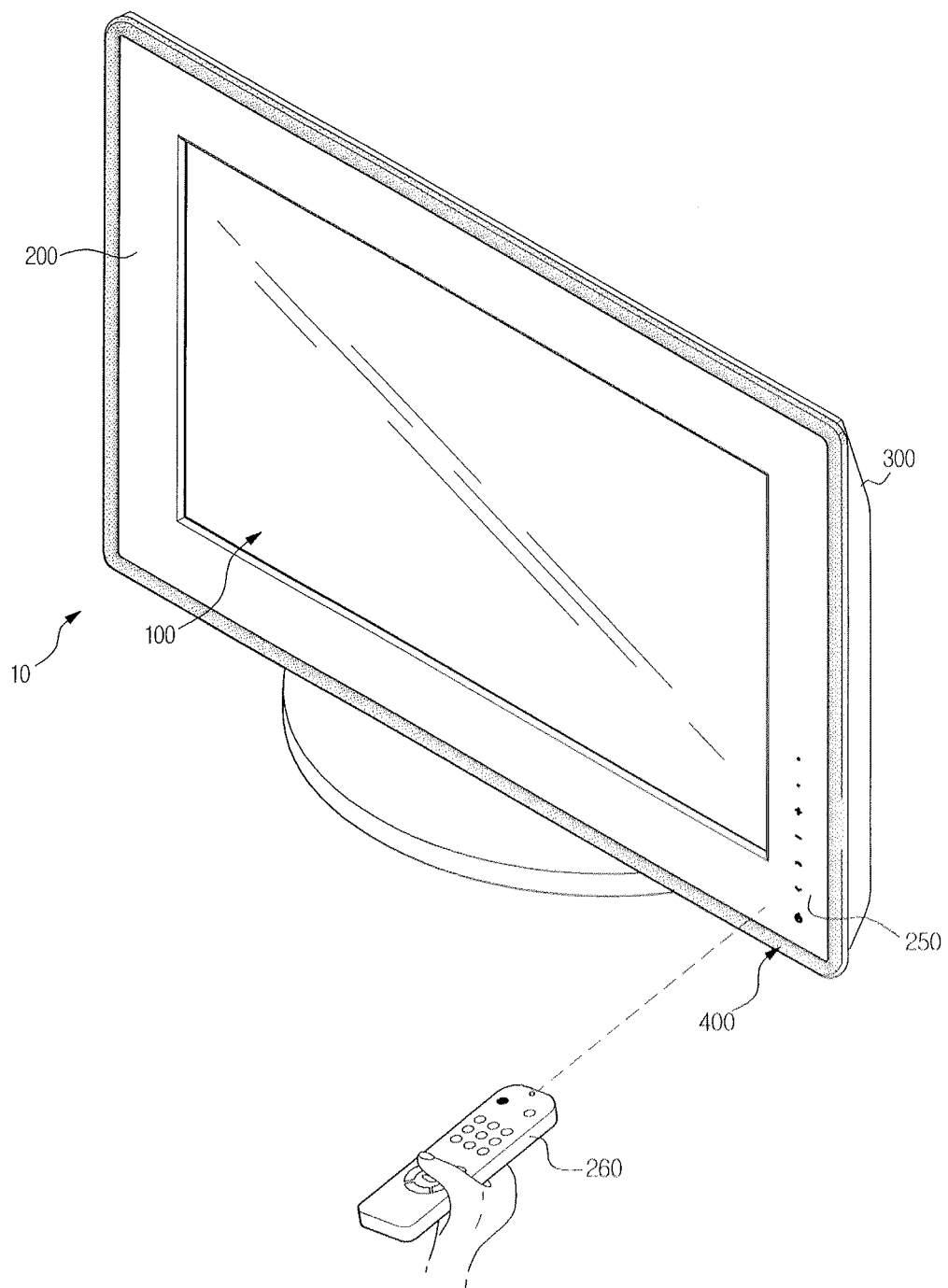
FIG. 5 is a view illustrating a user controlling the display apparatus with a remote control according to an exemplary embodiment of the present general inventive concept.
Figure 6:
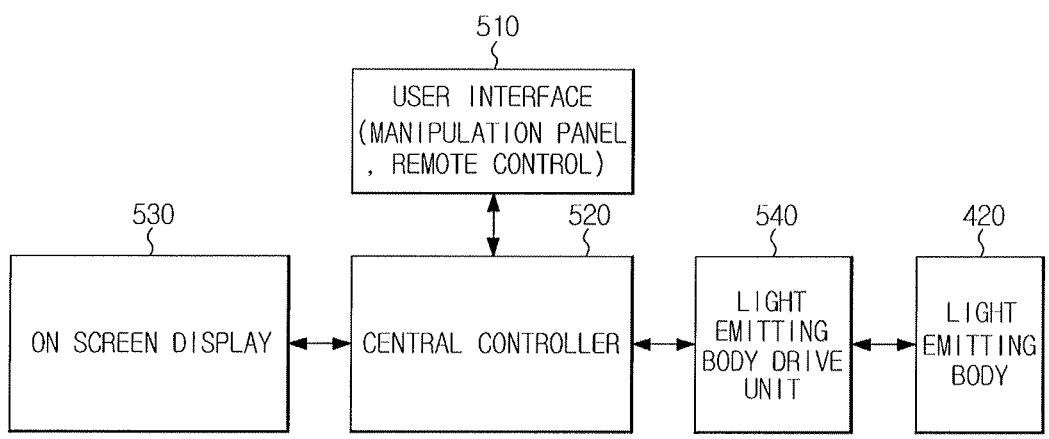
FIG. 6 is a block diagram illustrating the operation of a light emitting body according to an exemplary embodiment of the present general inventive concept.
Figure 7:
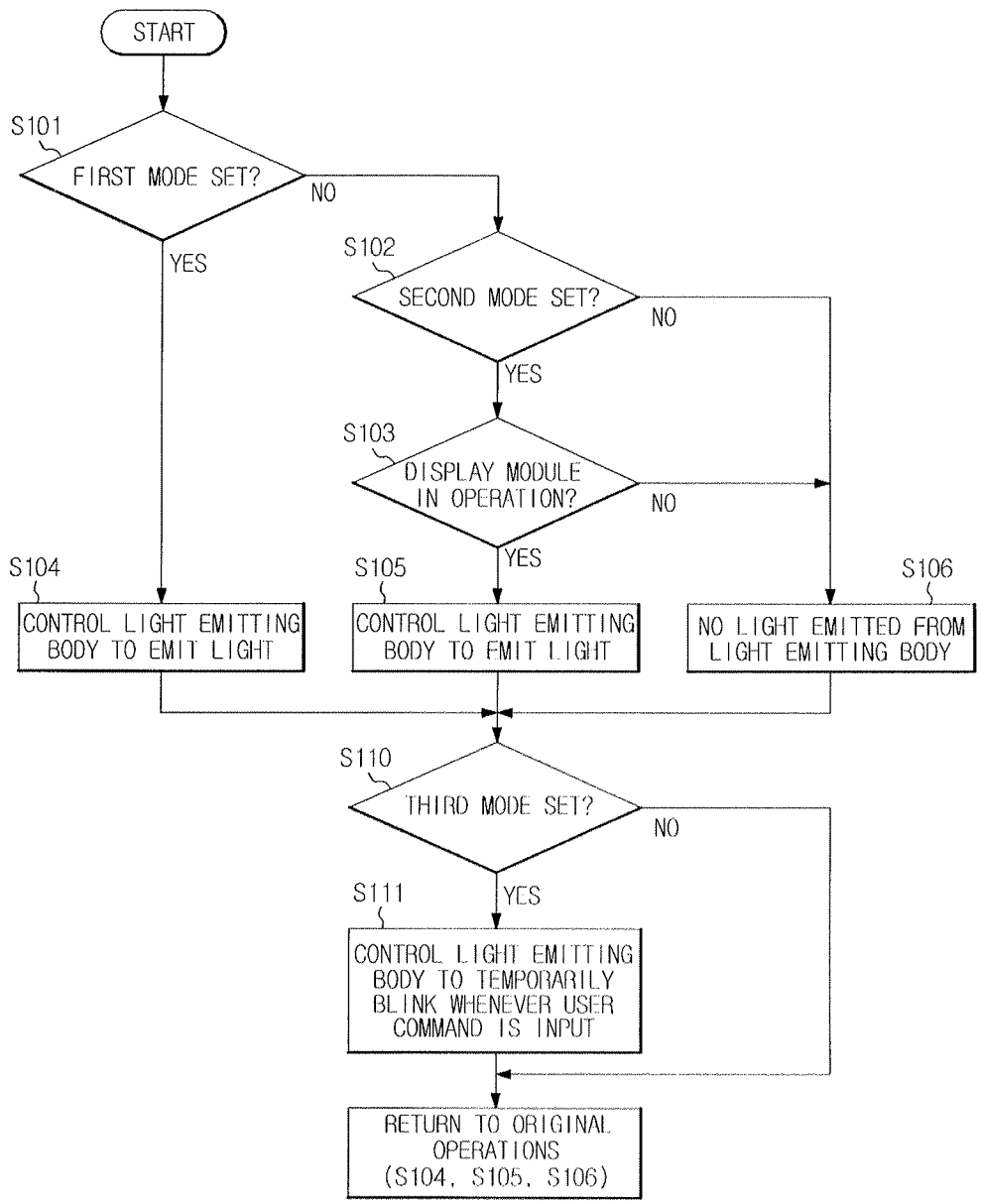
FIG. 7 is a flow chart illustrating controlling the operation of the light emitting body of FIG. 6.
Figure 8:
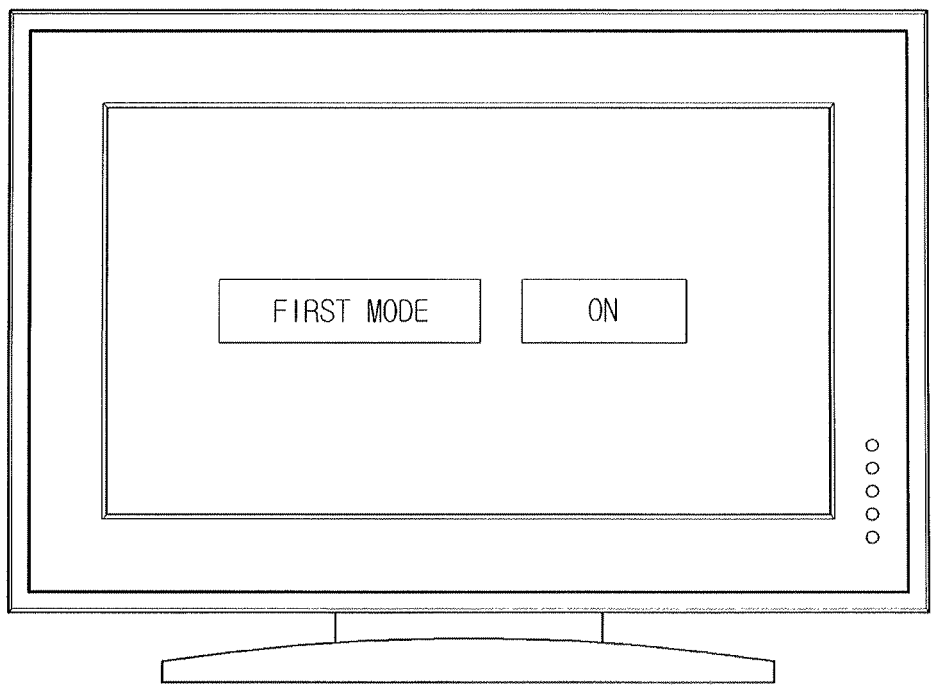
FIGS. 8 and 9 are views illustrating the selection of a light emission mode of the light emitting body using an on screen display.
Figure 9:
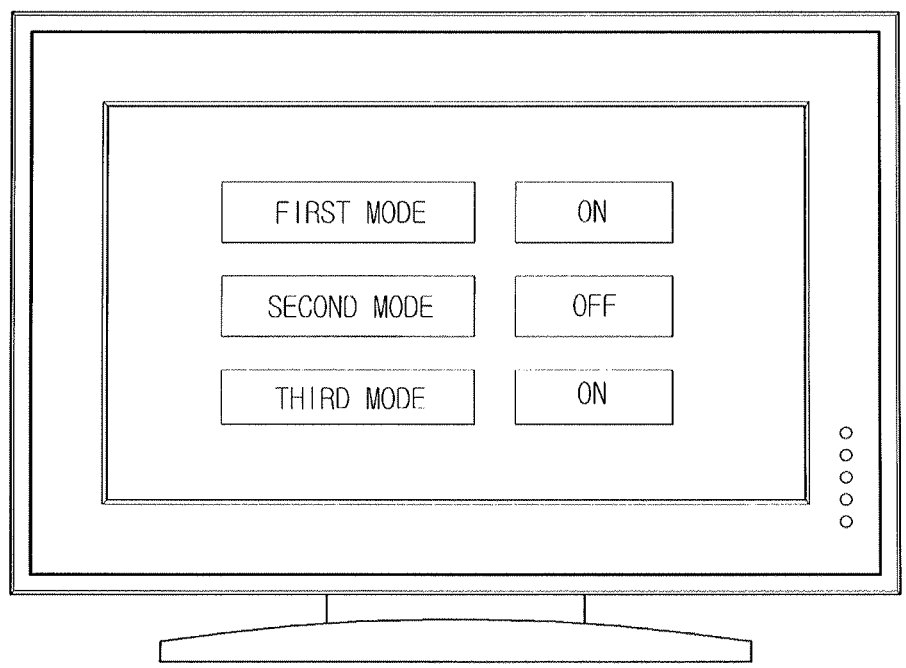

FIG. 5 is a view illustrating a user controlling the display apparatus with a remote control, FIG. 6 is a block diagram illustrating the operation of the light emitting body, FIG. 7 is a flow chart illustrating controlling the operation of the light emitting body, and FIGS. 8 and 9 are views illustrating the selection of a light emission mode of the light emitting body using an on screen display.

First, the operation of the light emitting body 420 will be described with reference to FIGS. 5 to 7. In connection with the operation of the light emitting body 420, the display apparatus 10 may include a user interface unit 510, a central controller 520, and a light emitting body drive unit 540.

As illustrated in FIGS. 5 and 6, the light emitting body 420 may be operatively connected to the user interface unit 510 to perform a light emitting operation. The user interface unit 510 may include a user interface (not illustrated) to allow a user to input a user command and a controller (not illustrated) to control the light emitting operation of the light emitting body 420 based on the user command.

The controller may include an on screen display 530 to display information to manipulate the display module on the display module. The light emitting operation of the light emitting body 420 may be selected by the selection of a menu item displayed through the on screen display 530.

When a user manipulates a manipulation panel 250 or a remote control 260 to input a user command, the user interface unit 510 may transmit the input value to the central controller 520. The central controller 520 may perform an overall control operation of the display apparatus 10. The central controller 520 may control the operation of the light emitting body 420 as well as operations related to image and sound formation of the display apparatus 10.

The central controller 520 may activate the on screen display 530 based on the user command.

The on screen display 530 may display information to manipulate image equipment on a screen apparatus. In a menu display method of the on screen display 530, a user may manipulate an input device, such as the manipulation panel 250 or the remote control 260, to select a function, with the result that menu items are displayed on the display module 10. The menu items may include items to adjust functions of the display apparatus 10. Subsequently, when the user selects one of the menu times using the manipulation panel 250 or the remote control 260, sub items of the selected menu item may be displayed on the display module 100.

The menu items related to the operation of the light emitting body 420 on the on screen display 530 may include a first mode in which the light emitting body 420 may emit light when power is supplied to the display apparatus 10 irrespective of the operation of the display module 100, a second mode in which the light emitting body 420 may emit light while an image is formed on the display module 100, and a third mode in which the light emitting body 420 may temporarily blink whenever a signal to manipulate the display apparatus 10 is input by a user.

Further, the controller may modify the light emitting mode in order to emit light that may flash or function as a strobe light. Also, the color and intensity of the light emitted by the light emitting body may be modified to fit the surroundings of the display apparatus. For example, the user may want to minimize the intensity of the light while the display apparatus is situated in a dark environment.

When the menu items are set on the on screen display 530, a signal may be transmitted to the light emitting body drive unit 540 through the central controller 520.

The light emitting body drive unit 540 may drive the light emitting body 420 included in the display apparatus 10. When a signal from the central controller 520 is input to the light emitting body drive unit 540, the light emitting body drive unit 540 may drive the light emitting body 420.

Controlling the operation of the light emitting body 420 will be described with reference to FIG. 7. First, it is determined whether the operation of the light emitting body 420 is set to a first mode (operation, S101). When the operation of the light emitting body 420 is set to the first mode, the light emitting body 420 may be controlled to emit light (operation, S104). When the operation of the light emitting body 420 is not set to the first mode, it may be determined whether the operation of the light emitting body 420 is set to a second mode (operation, S102). When the operation of the light emitting body 420 is set to the second mode, it may be determined whether the display module 100 is under operation (S103). When the display module 100 is under operation, the light emitting body 420 may be controlled to emit light (operation, S105). When the operation of the light emitting body 420 is not set to the second mode, or the display module 100 is not under operation, the light emitting body 420 may not emit light (operation, S106).

Subsequently, it is determined whether the operation of the light emitting body 420 is set to a third mode (operation, S110). When the operation of the light emitting body 420 is set to the third mode, the light emitting body 420 may be controlled to temporarily blink whenever a user command is input (operation, S111). When the blinking of the light emitting body 420 ends, or the operation of the light emitting body 420 is not set to the third mode, the procedure may return to original operations (S104, S105, S106).

In the first mode, the light emitting body 420 may emit light even when the display module 100 is not in operation, thereby improving aesthetic appearance of the display apparatus 10 and exhibiting interior decorative effects.

In the second mode, the light emitting body 420 may emit light only when the display module 100 is in operation, thereby having an indication function to indicate whether the display apparatus 10 is in operation as well as a design function.

In the third mode, a user may manipulate the manipulation panel 250 or the remote control 260 to input a signal, and the light emitting body 420 may temporarily blink in response to the input signal. In particular, the light emitting body 420 may emit light when, for example, a channel switching signal is input, thereby providing visual satisfaction to the user.

When the user does not wish to perform such operations, he/she may not set the operation modes such that the light emitting body 420 may not emit light.

In this way, the user may freely control the light emitting operation of the light emitting body 420 by selecting the menu items on the on screen display 530.

As illustrated in FIGS. 8 and 9, the operation mode of the light emitting body 420 may be selected by an on or off manipulation on the on screen display 530.

As illustrated in FIG. 8, only the first mode may be turned on such that the other modes are not displayed. In this case, the light emitting body 420 may continuously emit light when power is supplied to the display apparatus 10 irrespective of the operation of the display module 100.

As illustrated in FIG. 9, the first and second modes may be turned off and the third mode may be turned on. In this case, the light emitting body 420 may temporarily blink whenever a signal to manipulate the display apparatus 10 is input by a user.

The switching between on and off illustrated in FIGS. 8 and 9 may be achieved in a toggle switching manner.

Hereinafter, another exemplary embodiment of the present general inventive concept will be described with reference to a corresponding drawing. A description of the same components of this exemplary embodiment as the previously described embodiment will not be given.

Figure 10:
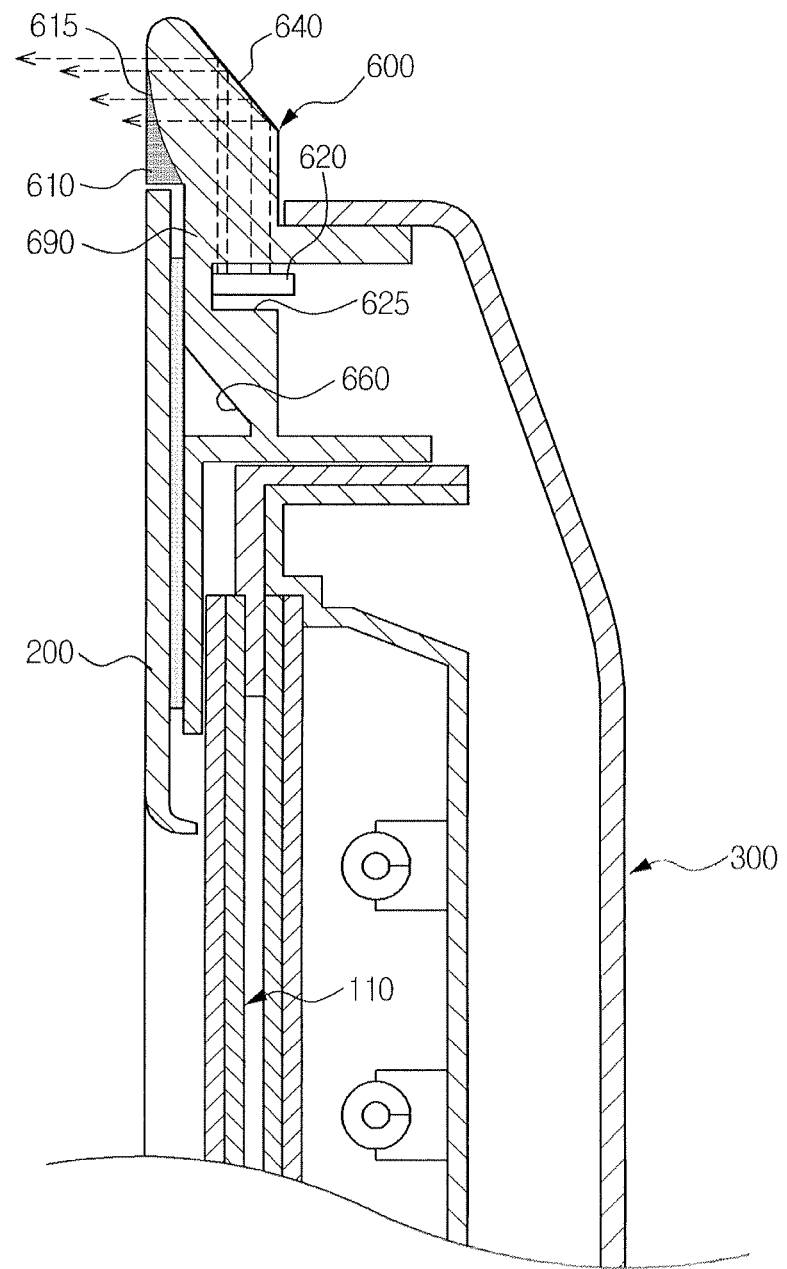
FIG. 10 is a sectional view illustrating a display apparatus according to another exemplary embodiment of the present general inventive concept.

FIG. 10 is a sectional view illustrating a display apparatus according to another exemplary embodiment of the present general inventive concept.

The display apparatus according to this exemplary embodiment of the present general inventive concept is identical in construction to the display apparatus 10 according to the previously described exemplary embodiment except for the construction of a bezel 600.

The bezel 600 may include a semitransparent part 610 formed of a semitransparent material to show color change and a transparent part 690 formed of a transparent material to easily transmit light. The semitransparent part 610 may be disposed in front of the transparent part 690.

The semitransparent part 610 may include a thickness change part 615. The thickness change part 615 may change light transmissivity of the semitransparent part 610.

Since the semitransparent part 610 has low light transmissivity at a relatively thick portion thereof, the color of the semitransparent part 610 is dark at the relatively thick portion thereof. Since the semitransparent part 610 has high light transmissivity at a relatively thin portion thereof, on the other hand, the color of the semitransparent part 610 is bright at the relatively thin portion thereof. Therefore, various changes of colors may be expressed in front of the display apparatus by appropriately adjusting a thickness change direction or degree at the thickness change part 615.

When the thickness of the thickness change part 615 is gradually decreased toward the outside of the bezel 600, for example, as illustrated in FIG. 10, the color of the thickness change part 615 may gradually be brightened toward the outside of the bezel 600.

Alternatively, the thickness of the thickness change part 615 may be gradually decreased toward the inside of the bezel 600 such that the color of the thickness change part 615 may gradually be brightened toward the inside of the bezel 600.

Also, the thickness of the thickness change part 615 may be abruptly changed to brighten a portion of the thickness change part 615, or the thickness of the thickness change part 615 may be gradually changed such that natural color change is expressed in front of the display apparatus.

In the same manner as the previously described exemplary embodiment of the present general inventive concept, the transparent part 690 may have a mounting groove 625, in which a light emitting body 620 may couple, a reflective surface 640, and a light interruption groove 660.

The other construction of the display apparatus and the operation of the light emitting body 620 are identical to the previously described exemplary embodiment.

Hereinafter, a further exemplary embodiment of the present general inventive concept will be described with reference to a corresponding drawing. A description of the same components of this exemplary embodiment as the previously described exemplary embodiments will not be given.

Figure 11:
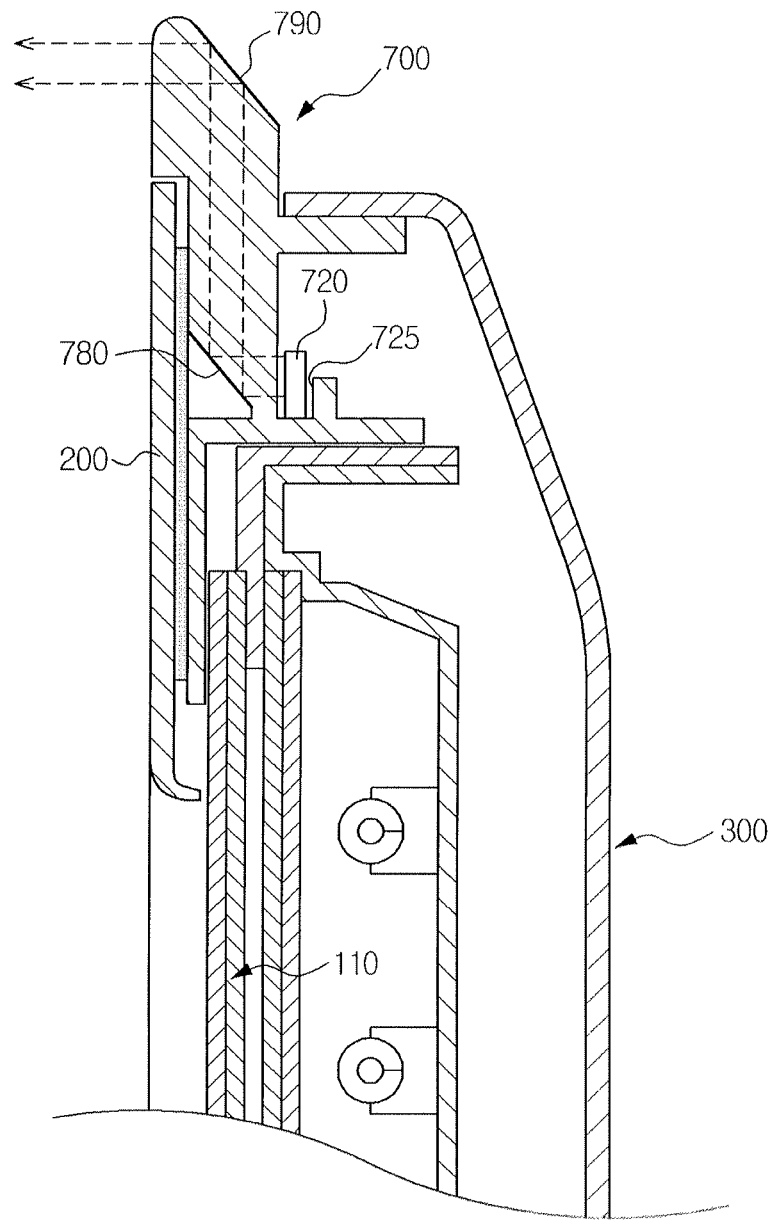
FIG. 11 is a sectional view illustrating a display apparatus according to a further exemplary embodiment of the present general inventive concept.

FIG. 11 is a sectional view illustrating a display apparatus according to a further exemplary embodiment of the present general inventive concept.

The display apparatus according to this exemplary embodiment is identical in construction to the display apparatus 10 according to the previously described exemplary embodiment except for the construction of a bezel 700.

The bezel 700 is different from the previously described embodiment in position of a light emitting body 720. That is, a mounting groove 725, in which the light emitting body 720 is mounted, is formed at the lower side of the bezel 700.

The bezel 700 may include a first reflective surface 780 adjacent to the light emitting body 720 and a second reflective surface 790 from which the light reflected from the first reflective surface 780 is reflected. The first reflective surface 780 may be disposed in front of the light emitting body 720, and the second reflective surface 790 may be disposed at the edge of the bezel 700.

Light emitted from the light emitting body 720 may be primarily reflected from the first reflective surface 780. The reflected light may be secondarily reflected from the second reflective surface 790 and is directed in front of the display apparatus. Even in this case, the light emitting body 720, the first reflective surface 780, and the second reflective surface 790 may be formed such that total reflection based on a principle of a critical angle is achieved as described in the previously described exemplary embodiment of the present general inventive concept.

The other construction of the display apparatus and the operation of the light emitting body 720 are identical to the previously described exemplary embodiment.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

As is apparent from the above description, the display apparatus may include a bezel in which a light emitting body is disposed, whereby aesthetic appearance of the display apparatus is improved.

Also, the light emitting body may emit light in various ways according to a user's intention, whereby the light emitting operation satisfying a user's demand is performed.

Also, a band light source body may be used as a light source of the light emitting body, whereby the light emitting operation at the corners of the display apparatus is easily performed.

Although a few exemplary embodiments of the present general inventive concept have been illustrated and described, it would be appreciated by those skilled in the art that changes may be made in these exemplary embodiments without departing from the principles and spirit of the general inventive concept, the scope of which is defined in the claims and their equivalents.

What is claimed is:

1. A display apparatus comprising:
a display module to form an image;
a cover to surround the display module;
a bezel to constitute a front edge of the cover, with the bezel including a semitransparent part disposed on an outer surface of the bezel; and
a light emitting body disposed adjacent to an inner surface of the bezel,
wherein the light emitting body is operatively connected to a user interface unit manipulated by a user to perform a light emitting operation, and
wherein light emitted from the light emitting body is incident on the bezel, and then transferred to an outside of the display apparatus through the bezel.

2. The display apparatus according to claim 1, wherein the light emitting body comprises:
at least one of a band light source body and a dot light source body as a light source.

3. The display apparatus according to claim 2, wherein the band light source body comprises:
at least one of an electro luminescent (EL) sheet and an optical fiber.

4. The display apparatus according to claim 1, wherein the semitransparent part is formed of a semitransparent material to show color change and the bezel further includes a transparent part formed of a transparent material to easily transmit light, the semitransparent part being disposed in front of the transparent part.

5. The display apparatus according to claim 4, wherein the semitransparent part comprises:
a thickness change part to induce color change by difference in light transmissivity.

6. The display apparatus according to claim 5, wherein the thickness change part has a thickness gradually decreased toward an outside of the bezel.

7. The display apparatus according to claim 1, wherein the cover comprises:

a front cover to cover a front edge of the display module; and a rear cover to cover a rear of the display module, the bezel being disposed between the front cover and the rear cover while surrounding an outside of the front cover.

8. The display apparatus according to claim 7, wherein the bezel is molded integrally with the front cover.

9. The display apparatus according to claim 7, wherein the bezel comprises:

a reflective surface to guide light emitted from the light emitting body in front of the front cover.

10. The display apparatus according to claim 9, wherein the reflective surface is provided at an edge of the bezel.

11. The display apparatus according to claim 7, wherein the bezel comprises:

a light interruption groove to prevent light emitted from the light emitting body from reaching the display module.

12. The display apparatus according to claim 11, wherein the light interruption groove is provided inside the bezel.

13. The display apparatus according to claim 9, wherein the front cover is formed of an opaque material to interrupt light.

14. The display apparatus according to claim 9, wherein the reflective surface comprises:

a first reflective surface adjacent to the light emitting body and a second reflective surface from which light reflected from the first reflective surface is reflected.

15. The display apparatus according to claim 14, wherein the first reflective surface is disposed in front of the light emitting body, and the second reflective surface is disposed at an edge of the bezel.

16. The display apparatus according to claim 9, wherein the front cover and the bezel are coupled to each other by a double-sided adhesive tape.

17. The display apparatus according to claim 9, wherein the front cover and the bezel are integrally molded by double injection.

18. The display apparatus according to claim 1, wherein the user interface unit comprises:

a user interface to allow a user to input a user command and a controller to control the light emitting operation of the light emitting body based on the user command.

19. The display apparatus according to claim 18, wherein the controller comprises:

an on screen display to display information to manipulate the display module on the display module, and the light emitting operation of the light emitting body is selected by selection of a menu item displayed through the on screen display.

20. The display apparatus according to claim 19, wherein the menu item comprises:

at least one selected from a group consisting of a first mode in which the light emitting body emits light as long as power is supplied to the display apparatus, a second mode in which the light emitting body emits light while the display module is under operation, and a third mode in which the light emitting body temporarily blinks whenever a signal to manipulate the display apparatus is input by a user.

21. A control method of a display apparatus comprising a display module to form an image, a user interface to allow a user to input a user command, a cover to surround the display module, a bezel to constitute a front edge of the cover, with the bezel including a semitransparent part disposed on a first surface of the bezel, and a light emitting body disposed in the bezel so as to be adjacent to a second surface of the bezel, the light emitting body to perform a light emitting operation according to a predetermined light emitting mode, wherein the control method comprises:

receiving the user command;

controlling the user command to be performed; and controlling the light emitting operation of the light emitting body to be performed when the user command corresponds to a predetermined value of the light emitting mode, wherein light emitted from the light emitting body is incident on the bezel, and then transferred to an outside of the display apparatus through the bezel.

22. The control method according to claim 21, wherein the light emitting mode is selected by selection of a menu item displayed through an on screen display to display information to manipulate the display module on the display module.

23. The control method according to claim 22, wherein the light emitting mode comprises:

at least one selected from a group consisting of a first mode in which the light emitting body emits light as long as power is supplied to the display apparatus, a second mode in which the light emitting body emits light while the display module is under operation, and a third mode in which the light emitting body temporarily blinks whenever a signal to manipulate the display apparatus is input by a user.

24. An interactive display apparatus with a front viewing side comprising:

a frame having an opening to expose a screen at the front viewing side;

a light emitting body disposed in the frame to emit light;

a bezel to surround the frame to deliver light from the light emitting body to an outside of the interactive display apparatus, the bezel including a semitransparent part disposed on an outer surface of the bezel;

a light emitting body disposed adjacent to an inner surface of the bezel; and a controller to control the light emitting body to emit the light, wherein light emitted from the light emitting body is incident on the bezel, and then transferred to an outside of the display apparatus through the bezel.

25. The interactive display apparatus of claim 24, wherein the frame further comprises:

at least one side to define a bezel opening exposing the bezel disposed around the screen facing the front viewing side.

26. The interactive display apparatus of claim 25, wherein the bezel further comprises:

a transparent part formed of a transparent material to easily transmit light, the transparent part includes:
  a first portion within the bezel opening;
  a second portion disposed in the frame facing the light emitting body; and
  a third portion connecting the first portion and second portion.

27. The interactive display apparatus of claim 24, wherein the controller selects at least one light emitting operation of the light emitting body and the at least one light emitting operation comprises a first mode in which the light emitting unit emits light as long as power is supplied to the interactive display apparatus, a second mode in which the light emitting unit emits light while the display module is under operation, and a third mode in which the light emitting unit temporarily blinks whenever a signal to manipulate the interactive display apparatus is input by a user.

28. A display apparatus comprising:

a display module to display an image;

a frame disposed to support the display module;

a bezel is disposed in the frame to expose the light to an outside of the frame, the bezel including a semitransparent part disposed on an outer surface of the bezel;

a light emitting body disposed adjacent to an inner surface of the bezel; and a controller to control the display module and to control the light emitting body to change a light emitting operation of the light emitting body.

29. The display apparatus of claim 28, wherein the frame further comprises:

a front cover to cover a front edge of the display module; and a rear cover to cover a rear of the display module, the bezel disposed between the front cover and rear cover and disposed within an opening between the front cover and rear cover.

30. The display apparatus of claim 28, wherein the bezel further comprises:

a band light source, wherein the semitransparent part gradually decreases in thickness toward the outside of the bezel.

31. A control method of a display apparatus comprising a display module to form an image, a user interface to allow a user to input a user command, a cover to surround the display module, a bezel to constitute a front edge of the cover, with the bezel including a semitransparent part, and a light emitting body disposed in the bezel, the light emitting body to perform a light emitting operation according to a predetermined light emitting mode, wherein the control method comprises:

receiving the user command;

controlling the user command to be performed; and controlling the light emitting operation of the light emitting body to be performed when the user command corresponds to a predetermined value of the light emitting mode, wherein light emitted from the light emitting body is incident on the bezel, and then transferred to an outside of the display apparatus through the bezel, wherein the light emitting mode is selected by selection of a menu item displayed through an on screen display to display information to manipulate the display module on the display module.

* * * * *

UNITED STATES PATENT AND TRADEMARK OFFICE
CERTIFICATE OF CORRECTION

Page 1 of 1

PATENT NO.         : 9,013,371 B2
APPLICATION NO.    : 12/781019
DATED              : April 21, 2015
INVENTOR(S)        : Sung Soo Jung It is certified that error appears in the above-identified patent and that said Letters Patent is hereby corrected as shown below:

In the Claims

Claim 28, Column 13, Line 2:

After "expose" delete "the".

Signed and Sealed this
Twenty-ninth Day of September, 2015

Michelle K. Lee
*Director of the United States Patent and Trademark Office*